(12) United States Patent
Morgan et al.

(10) Patent No.: US 8,377,346 B2
(45) Date of Patent: Feb. 19, 2013

(54) POWDER COATING EXTRUSION PROCESS USING LIQUID

(75) Inventors: Andrew Robert Morgan, Ryton (GB); Stephen Raymond Wilburn, South Shields (GB); Edward Clark, Low Fell (GB)

(73) Assignee: Akzo Nobel Coatings International B.V., Arnhem (NL)

( * ) Notice: Subject to any disclaimer, the term of this patent is extended or adjusted under 35 U.S.C. 154(b) by 100 days.

(21) Appl. No.: 12/678,076

(22) PCT Filed: Sep. 11, 2008

(86) PCT No.: PCT/EP2008/062012
§ 371 (c)(1),
(2), (4) Date: Mar. 12, 2010

(87) PCT Pub. No.: WO2009/034112
PCT Pub. Date: Mar. 19, 2009

(65) Prior Publication Data
US 2010/0305268 A1    Dec. 2, 2010

Related U.S. Application Data

(60) Provisional application No. 60/974,589, filed on Sep. 24, 2007.

(30) Foreign Application Priority Data

Sep. 14, 2007  (EP) .................................... 07116489

(51) Int. Cl.
*B29B 9/00*    (2006.01)
(52) U.S. Cl. ................. 264/5; 264/13; 523/348
(58) Field of Classification Search ............... 264/5, 13; 523/348, 1
See application file for complete search history.

(56) References Cited

U.S. PATENT DOCUMENTS

| 3,170,890 A | 2/1965 | Boyd et al. |
| 3,585,065 A | 6/1971 | Johnson |
| 4,107,148 A | 8/1978 | Fujiyoshi et al. |
| 4,879,344 A | 11/1989 | Woo et al. |
| 5,017,451 A * | 5/1991 | Larson et al. ............ 430/137.19 |
| 5,766,522 A | 6/1998 | Daly et al. |
| 6,512,025 B2 * | 1/2003 | Choudhery ................... 523/348 |
| 2003/0092799 A1 * | 5/2003 | Koenraadt et al. ............ 523/336 |

FOREIGN PATENT DOCUMENTS

| EP | 0 887 389 | 12/1998 |
| EP | 0 887 390 | 12/1998 |
| GB | 2 118 188 | 10/1983 |
| WO | WO 2005/102665 | 11/2005 |
| WO | WO 2005/103170 | 11/2005 |
| WO | WO 2007006777 A1 * | 1/2007 |

OTHER PUBLICATIONS

A.D. Salman et al., "Particle Impact Breakage in Particulate Processing," *KONA*, No. 21, pp. 88-99, 2003.

(Continued)

*Primary Examiner* — Galen Hauth
(74) *Attorney, Agent, or Firm* — Kenyon & Kenyon LLP (57) ABSTRACT

A process for the manufacture of a powder coating comprising the steps of: Preparing a powder coating premix comprising a resin and optionally a crosslinker therefor; Feeding the premix through a melt extruder; Cooling the extruded material; and Comminuting it to fine particles, wherein said process is characterized in that between 1 and 25 wt. % (based on the weight of said premix) of a process liquid is added to the melt extruder, wherein said process liquid is immiscible with at least said resin of the powder coating premix and wherein said process liquid evaporates when the premix leaves the extruder.

14 Claims, 4 Drawing Sheets

OTHER PUBLICATIONS

W. Weibull et al., "A Statistical Distribution Function of Wide Applicability," *Journal of Applied Mechanics*, pp. 293-297, Sep. 1951.

T.G. Fox, "Influence of Diluent and of Copolymer Composition on the Glass Temperature of a Polymer System," *Bull. Amer. Physics Soc.*, 1,3, p. 123, 1956.

G.F.C. Rogers et al., "Thermodynamics and Transport Properties of Fluids, SI Units," $5^{th}$ Edition, 1995.

International Search Report and Written Opinion, PCT International Application PCT/EP2008/062012, mailed Aug. 25, 2009.

International Preliminary Report on Patentability, PCT International Application PCT/EP2008/062012, mailed Mar. 16, 2010.

* cited by examiner

POWDER COATING EXTRUSION PROCESS USING LIQUID

REFERENCE TO RELATED APPLICATION(s)

This application is the U.S. National Phase of PCT/EP2008/062012 filed on Sep. 11, 2008 and claims the benefit of U.S. Provisional Application No. 60/974,589 filed on Sep. 24, 2007.

FIELD OF THE INVENTION

The present invention relates to a process for preparing a powder coating composition, and more particularly to a powder coating extrusion process in which a liquid is injected into the extruding device.

BACKGROUND TO THE INVENTION

Powder coating compositions are solid compositions that generally comprise a solid film-forming resin, usually with one or more pigments and, optionally, one or more performance additives such as plasticizers, stabilizers, flow aids and extenders. The resins are usually thermosetting, incorporating, for example, a film-forming polymer and a corresponding crosslinking agent (which may itself be another film-forming polymer). Generally, the resins have a $T_g$, softening point or melting point above 30° C.

Conventionally, the manufacture of a powder coating comprises melt-mixing the components of the composition. Melt-mixing involves the high speed, high intensity mixing of dry ingredients and then the heating of the mixture to an elevated temperature—above the softening temperature of the resin but below the curing temperature—in a continuous compounder to form a molten mixture. The compounder preferably comprises a single or twin screw extruder as these serve to improve the dispersion of the other ingredients in the resin as the resin melts. The molten mixture is extruded, typically rolled in the form of a sheet, cooled to solidify the mixture and subsequently crushed (pulverized).

Such processing is then generally followed by a sequence of particle sizing and separation operations—such as grinding, classifying, sifting, screening, cyclone separation, sieving and filtering—that precede the application of the powder to a substrate and the heating of that powder to melt and fuse the particles and to cure the coating. The main methods by which powder coatings are applied include fluidized-bed and electrostatic fluidized—bed processes and electrostatic spray processes in which the powder coating particles are electrostatically charged by a spray gun and directed onto an earthed substrate.

Each of these application methods requires the powder to have a specific particle size distribution. For example, most commercial electrostatic spray devices can only apply particles having mean particle sizes up to 120 µm; more optimal particle size ranges for such apparatus are in the range from 15 to 75 µm, and ideally preferably from 20 to 45 µm. In separating out the undesirable large and small particles from the powder particles having the desired size distribution, the various particle separation techniques obviously generate waste powder which must either be downgraded or disposed of.

Studies of the breakage of materials into particles such as KONA Vol. 21, (2003), pp. 88 have demonstrated that, whilst material properties related to comminution—such as modulus, hardness and strength—are generally measured and defined on the macroscopic scale, the microscopic structure of the materials is determinant. The initiation of fractures in a material is believed to occur through the presence of microscopic weaknesses; those on the perimeter of the impact contact area suffer the greatest strain during impact, leading to fracture of the material.

That function which characterizes the size distribution of particles from a comminution process is generally considered to be log-normal; it derives from the statistical probability of the breaking of the weakest link in a chain. Such a function was described inter alia by Weibull in *A statistical distribution function of wide applicability* Journal of Applied Mechanics, 9, 1951, 293-297:

$$P_B = 1 - \exp\left\{-z\left(\frac{\sigma}{\sigma_s}\right)^m\right\}$$

wherein:

$P_B$ is the probability of breaking a chain which consists of z links of strength $\sigma_s$;

$\sigma$ is the load applied; and m is a parameter of the probability distribution, unrelated to any physical property of the material.

According to this function, an increase in the number (z) of weaknesses within a material and decrease in strength ($\sigma_s$) of those weaknesses will result in a higher breakage probability. Therefore, the deliberate formation of weaknesses within the material will act to increase the probability of breakage.

EP-A-0887389 and EP-A-0887390 (Morton International, Inc.) describe methods for producing a powder coating in which direct particle production is enabled by the introduction of gas cells within the powder coating precursor or the extrudate. In these methods a stream of a powder coating precursor including at least one resin and at least one additional ingredient is contacted with a process fluid effective to reduce the viscosity of the powder coating precursor during its extrusion. In a first embodiment, the extrusion of the precursor results in the evaporation (expansion) of the process fluid and thereby results in the direct atomisation of the extrudate into particulate form. In a second embodiment, that evaporation yields a foamed or friable mass of extrudate which must then be subjected to grinding to form particles.

In EP-A-0887389 the process fluid is characterized as being in the form of a supercritical fluid or a liquefied gas whereas in EP-A-0887390 the process fluid is in the form of a gas; these harsh fluid conditions are required to plasticize the resin to thereby reduce the viscosity of the powder coating precursor. Therefore, although these two citations purport to allow processing of the powder coating precursor at lower temperatures, this effect is compensated by the energetic costs required to first elevate the temperature of the process fluids such that they can achieve vapour or supercritical conditions within the extruder. Furthermore, any process fluids that are to be recycled after they exit the extruder must be subjected to pressure boosting at a further energetic cost. As the process fluids are added in relative amounts of up to 90% by weight of the resin, these energetic costs may be significant.

STATEMENT OF THE INVENTION

In accordance with the invention there is provided a process for the manufacture of a powder coating comprising the steps of:

Preparing a powder coating premix comprising a resin and optionally a crosslinker for said resin;

Feeding the premix through a melt extruder;
Cooling the extruded material; and,
Comminuting it to fine particles.

Said process is characterized in that between 1 and 25 wt. % (based on the weight of said premix) of a process liquid is added to the melt extruder, wherein said process liquid is immiscible with at least said resin of the powder coating premix and wherein said process liquid evaporates when the premix leaves the extruder.

The process liquid may be added directly into the premix in the molten state within the melt extruder. Additionally, it may be added at one or more points along the path of the melt through the extruder. It is also considered that at least part of the process liquid may be combined with the premix and the two components fed together into the melt extruder.

On exiting the melt extruder, the evaporation of the process liquid firstly acts to cool the molten extrudate. Furthermore, the evaporation introduces discontinuities into the cooling, solidifying extrudate which allow for that extrudate to be more easily broken into particles of particular dimensions.

As the process liquid is required to be immiscible with at least the resin of the powder coating premix, liquids which plasticize or solubilize that resin—including liquids such as supercritical water and supercritical carbon dioxide—are not suitable for use in this invention.

Process liquids which are immiscible with the molten resin form a second liquid phase within the extruder. The resultant two-phase system may lower the viscosity of the premix within the extruder. In addition, the introduction of the immiscible process liquid induces weaknesses in the bulk extrudate material at a nano-scale in addition to those weaknesses formed by the introduction of gaseous voids through the evaporation of the process liquid.

Preferably the process liquid is also chemically inert to the components of the premix and is completely removed by evaporation at the exit of the extruder. More preferably the process liquid is selected from the group consisting of water, demineralised water and distilled water. Alternatively it is envisaged that volatile silicone oils, and liquid mixtures or emulsions thereof, may be used as the process liquid. Volatile silicone oils suitable for use as process liquids include, but are not limited to, hexamethyldisiloxane, octamethyltrisiloxane, decamethyltetrasiloxane and dodecamethylpentasiloxane.

Optionally the process liquid can contain up to 50% of dissolved materials such as carbon dioxide, nitrous oxide or ammonia which may or may not be reactive with the components of the premix but influence the polar response of the resin and thus the dimensions and structure of the two phases in the melt extruder. It is also envisaged that water soluble crosslinkers, such as Primids, may be dissolved within an aqueous process liquid.

It is preferred that the process liquid is added to the extruder in an amount between 1 and 15 wt. % (based on the weight of the premix), preferably between 3 and 14 wt. % and more preferably between 4 and 7 wt. %. Without being bound by theory, when the process liquid comprises water, the nano-scale weaknesses are believed to result from a hydrophobic interaction between the process liquid phase and resin phase. This interaction orientates the resin within the premix; the non-polar polymer components of the premix mass together with the more polar components of the premix being presented to the process fluid. It is believed that such structural orientations are sufficiently retained during cooling.

The small amount of liquid added to the melt extruder has minimal quenching effect on that temperature in the extruder necessary to maintain the premix in a molten state. The liquid quickly equilibrates to the temperature and pressure of the melt extruder at the point of liquid injection.

The resin of the premix is not intended to be a limiting feature of this invention and may comprise any known thermoplastic or thermosetting resin utilized for powder coating compositions. However, the resin should ideally melt at a temperature less than 200° C., preferably in the range from 50° C. to 175° C. and more preferably from 100° C. to 140° C. When the temperature of the extruder is set at these melt temperatures, the conditions in the extruder must also be characterized by a particular pressure such that the injected liquid does not attain supercritical conditions. Where water or demineralised water is employed as the injected liquid, for melt temperatures less than 200° C. the extruder pressure should be in the range from 1 to 16 bar; where the melt temperatures are in the range from 100° C. to 140° C. the pressure should be in the range from 1.5 to 3.6 bar, respectively.

In a first preferred embodiment of the invention, the thermosetting resin may comprise a carboxyl functional polyester or a hydroxyl functional polyester. Where said resin comprises a hydroxyl functional polyester, the crosslinker in said powder coating premix should preferably comprise an aliphatic or aromatic isocyanate or an aminoplast.

In an alternative embodiment of the invention, the thermosetting resin may be a hybrid system selected from the group consisting of epoxy-acrylic, polyester-acrylic, and epoxy-polyester resin systems.

BRIEF DESCRIPTION OF THE DRAWINGS

The present invention will be described with reference to the appended drawings in which.

DETAILED DESCRIPTION OF THE INVENTION

Definitions

For the purpose of describing the proportions of components in the compositions of this invention, the term "resin" includes any resin or polymer per se, as well as the curing agent.

When used herein, the "glass transition temperature" or $T_g$ of any polymer may be calculated as described by Fox in *Bull. Amer. Physics. Soc.*, 1, 3, page 123 (1956). The $T_g$ can also be measured experimentally using differential scanning calorimetry (at a rate of heating 20° C. per minute, wherein the $T_g$ is taken at the midpoint of the inflection). Unless otherwise indicated, the stated $T_g$ as used herein refers to the calculated $T_g$.

The Powder Coating Premix

The powder coating premix of the present invention necessarily comprises a resin and a crosslinker therefor. The premix may obviously comprise other components as are known in the art and which will be discussed hereinafter.

1. Resins and Crosslinkers

The resins and the crosslinking systems in the powder composition are not intended to be limiting features of the present invention. Accordingly, suitable resins for inclusion within the powder coating premix include both thermoplastic and thermoset base resins.

When used in powder coatings, thermoplastic resins must melt and flow out to a thin film within a few minutes at stoving temperatures from 120° C. to 300° C. without significant degradation. As a result suitable thermoplastic resins for use in the practice of the present invention include polyamides, polyesters, cellulose esters, polyethylene, polypropylene, poly(vinyl chloride) [PVC], poly(vinylidene fluoride) [PVF2], polyphenylsulfones and poly(tetrafluoroethylene) [PTFE] of which polyphenylsulfones and PTFE are particularly preferred. All of the suitable thermoplastic resins are readily available from commercial sources.

The thermosettable resins which are suitable for this invention include epoxy resins, polyurethanes, silicones, crystalline resins, polyesters (including unsaturated polyesters), acrylics, and hybrids such as epoxy-acrylic, polyester-acrylic, and epoxy-polyester. The glass transition temperature ($T_g$) of these resins must be high enough that the particles do not fuse together or sinter at temperatures likely to be encountered during transportation and storage. Preferably, the $T_g$ is in the range from 45° to 120° C., within which range a $T_g$ greater than 55° is more preferred.

1.1 Epoxy Resins

Suitable epoxy resins are those containing aliphatic or aromatic backbones with oxirane functionality and are exemplified by: the diglycidyl ether condensation polymers resulting from the reaction of epichlorohydrin with a bisphenol e.g. bisphenol A and bisphenol F in the presence of an alkaline catalyst; and, glycidyl ethers of phenolic novolac resins synthesised by reacting phenolic novolac resin with epichlorohydrin in presence of sodium hydroxide as a catalyst.

Generally the epoxy resins should have: an epoxide equivalent weight (EEW) between 600 and 2000; a hydroxyl equivalent weight between 300 and 400; and, a melt viscosity in the range from 200 to 2000 centipoise (cps) at 150° C., preferably from 300 to 1000 cps. The low melt viscosities of such resins may allow them to be extruded at temperatures less than 200° C.

Commercially available epoxy resins which are preferred for the purposes of this invention are the bisphenol A epoxies sold under the trademarks ARALDITE® GT-7004, GT-7071, GT-7072, GT-6259 (Huntsman LLC) EPON® 1001 and 2042 (Shell Chemicals, Inc.).

A wide variety of curing agent for epoxy resins is available depending on the process and properties required. Dicyandiamide, modified and substituted dicyandiamides, solid dicarboxylic acids and their anhydrides are examples of those agents that may be used for the curing of epoxy resins. A curing agent in solid form is preferred for convenience in the formulation of epoxy resin-based powders as well as in the formulation of other resin-based powders in this invention.

1.2 Silicone Resins

Silicone resins for use in this invention should be: solid at room temperature; have a $T_g$ of greater than 55° C., preferably greater than 60° C.; and a viscosity of between about 500 and about 10,000 cps at 150° C., preferably 2000 to 5000 cps.

Suitable silicone resins for use in this invention are described inter alia in U.S. Pat. Nos. 3,170,890; 4,879,344; 3,585,065; and, 4,107,148 the disclosures of which are herein incorporated by reference. Examples of suitable, commercially available silicone resins are phenylsilicone SY-430 and methylsilicone MK (both products of Wacker Silicone, USA) and methylphenylsilicone 6-2230 (Dow Corning).

1.3 Hydroxy-Functional Polyester Resins

Suitable hydroxy functional polyesters for use in the process of this invention are predominantly hydroxyl in functionality and should preferably be characterized by having: i) a hydroxyl number in the range from about 25 to about 50; ii) an acid number less than or equal to 15 but preferably in the range from about 1 to 2; and, iii) a $T_g$ higher than 50° C.

Hydroxy functional polyesters meeting these requirements are commercially available as RUCOTE® 107, CARGILL® 3000/3016, and CRYLCOAT® 3109. Equally, however such polyesters may be formed as the condensation products of polybasic carboxylic acids and polyhydric alcohols. As such, carboxylic acids useful for the preparation of such polyester resins include one or more of phthalic acid, tetra- and hexahydrophthalic acids and their anhydrides, succinic acid, adipic acid, sebacic acid, terephthalic and isophthalic acids, 1,3- and 1,4-cyclohexane-dicarboxylic acids, and trimellitic anhydride, esters of such acids. Further, suitable difunctional alcohols include ethylene-, diethylene-, propylene-, isomers of 1,2 and 1,3 propylene glycol and trimethylene glycol and suitable dihydric alcohols include hexanediol, 1,3-, 1,2-, and 1,4-butanediols, neopentyl glycol, 2-butyl-2-ethyl-1,3-propanediol, 2-methyl-1,3-propanediol, 1,4-cyclohexanediol, trimethylolpropane, and mixtures thereof. The skilled reader will be aware of a number of such acids and alcohols and processes for carrying out the condensation of the acids and alcohols.

The hydroxyl-functional polyesters are curable through the hydroxyl groups with aliphatic and aromatic isocyanates and with aminoplasts. Isocyanate curing forms resins which technically are polyesters but when cured are described as polyurethanes. Aminoplasts are oligomers that are the reaction products of aldehydes, particularly formaldehyde, with amino- or amino-group-carrying substances exemplified by melamine, urea, dicyandiamide, and benzoguanamine. It is preferable in many instances to employ precursors of aminoplasts such as hexamethylol melamine, dimethylol urea, and their etherified forms, i.e., modified with alkanols having from one to four carbon atoms. Hexamethoxymethyl melamine and tetramethoxy glycoluril exemplify said etherified forms. Particularly preferred are the amino cross-linking agents CYMEL® available from American Cyanamid. Thus, a wide variety of commercially available aminoplasts and their precursors can be used for combining with hydroxyl functional polyesters of this invention.

Aminoplast curing agents are typically provided in an amount sufficient to react with at least one-half the hydroxyl groups of the polyester, i.e., an amount at least one-half the stoichiometric equivalent of the hydroxyl functionality. Those skilled in the art will choose the correct stoichiometric ratio and catalyst level to achieve the desired coating performance. Preferably, the amount of cross-linking agent is sufficient to substantially completely react with all of the hydroxyl functionality of the polyester, and cross-linking agents having nitrogen cross-linking functionality are provided in amounts of from about 2 to about 12 equivalents of nitrogen cross-linking functionality per equivalent of hydroxyl functionality of the polyester.

Acidic catalysts may be used to modify the curing of the polyester with an aminoplast resin by lowering the required temperature or raising the reaction rate or both. When it is desirable to lower the rate at ambient storage temperatures, the acidic catalyst may be blocked with an amine. Volatile amines which may escape from the curing film when the catalyst is unblocked by heat are suitable for this purpose. It is particularly desirable for the purposes of this invention to delay full curing of the composition. NACURE® 1557, an amine-blocked dinonylnaphthalenesulfonic acid available King Industries, is an example of the blocked acid catalyst suitable for use in the aminoplast curing of the powder coating composition of this invention.

Diisocyanates cure hydroxy-functional polyester resins by forming urethane linkages between the polymer chains at the hydroxyl group sites. Common aliphatic diisocyanates are exemplified by hexamethylene diisocyanate (HDI), diisocyanato di-cyclohexylmethane (sold as DESMODUR W® by Mlles Chemical) and isophorone diisocyanate (IPDI). Toluene diisocyanate (TDI) is an example of a suitable aromatic diisocyanate. The low-temperature reactivity of free diisocyanates may be reduced by adducting them with blocking agents selected from phenol, cresols, isononylphenol, amides such as epsilon-caprolactam, oximes such as methyl-ethyl ketoxime and butanoneoxime, active methylene group-containing compounds such as diethylmalonate, and isopropylidene malonate and the acetoacetates, and sodium bisulfate. Examples of the blocked diisocyanates include caprolactam blocked isophorone diisocyanate and caprolactam blocked hexamethylene diisocyanate. Examples of commercially available curing agents of this type are the 24-2400, 24-2430, and 24-2450 products sold under the CARGILL trademark. Another group of blocked curing agents are the uretdiones which can be described as internally blocked.

1.4 Carboxy Functional Polyester Resins

Carboxyl-functional polyesters are also suitable for the purposes of this invention. These may be made from the same polyfunctional acids and glycols as the hydroxyl-functional polyesters but with an excess of the acids. The acid number is from about 10 to about 100. Suitable commercial products are: CRYLCOAT® 430, 3010 and 7617 (available from UCB); URALAC® 3400 and 3900; EL6500 or EL6700 or EL8800 available from Chan Sieh Enterprises Fast cure of these carboxy functional polyesters may be achieved with polyepoxide curing agents such as triglycidyl isocyanurate (TGIC).

Further alternatives curing agents to TGIC include: Primids, such as Primid XL552 and QM1260 which are hydroxyalkylamides available from EMS-Primid; Araldite PT910 gylcidyl ester available from Ciba Geigy; and Uranox available from DSM.

Unsaturated polyesters suitable for use in the practice of the invention include ethylenically unsaturated reaction products of an organic di- or polyfunctional acid and a di- or polyfunctional alcohol. Typically the acid is unsaturated. Such polyester resins typically work best in combination with a copolymerizable second resin such as diallyl phthalate. Initiators may also need to be incorporated.

1.5 Acrylic Resins

The preferred acrylic resins for powder coatings are copolymers of alkyl acrylates and/or methacrylates with glycidyl-methacrylates and/or acrylates and olefinic monomers such as styrene. Glycidyl-functional acrylic resins are sold by Mitsui Toatsu Chemicals, Inc. as ALMATEX® for which a carboxy-terminated polymer may be used as a cross-linking agent. Hydroxyalkyl acrylate and methacrylate copolymers are also suitable for this invention.

1.6 Hybrid Resin Systems

Hybrid resin systems, such as the epoxy-acrylic and polyester-acrylic mixtures, are also suitable for this invention. However, where such a system is employed, it is preferably a polyester-epoxy hybrid. As known in the art, polyester-epoxy hybrids comprise both epoxy resins and carboxyl terminated polyester resins and may also comprise a catalyst to drive the curing reaction. Typically, the acidic polyester has an equivalent weight between 600 and 4000 and the epoxy resin has an equivalent weight between 400 and 1100. Catalysts for the epoxy-acid reaction include quaternary ammonium salts, quaternary phosphonium salts, phosphines, amines, imidazoles and metal salts. Amphoteric catalysts such as, zinc oxide ($ZnO_2$) is effective at 1-5 parts per hundred parts by weight of the resins to improve the cure rate and physical properties of the product.

2. Further Components of the Premix

In addition to the resin and cross-linking components described above the powder coating compositions may comprise other components that are conventionally known in the art. These may include: pigments (including metal flake pigments) fillers; flow control agents; degassing agents; antiblocking agents; and, pigments. However, further suitable additives may include: adhesion promoters; light stabilizers and UV absorbers; flow and leveling additives; gloss-modifying additives; cratering agents; cure agents; texturizers; surfactants; wetting agents; antioxidants (in particular phosphites, hindered phenols and propionates); biocides; and, organic plasticizers.

In accordance with this invention, fillers may be employed to reduce cost and/or reinforce or modify the performance and appearance of the coatings. Fillers comprising glass particles, glass fibres, metal fibers, metal flakes and particles of micas or calcium metasilicate could be included in the powder coating compositions of this invention. Inorganic sulphates such as barites, carbonates such as chalk, and silicates such as talc are commonly used.

Metallics including zinc rich anticorrosive particulates may be added to powder coating compositions to impart corrosion resistance to the underlying substrate.

Flow control agents may be present in the powder coating compositions in an amount up to 3 wt. % based on the weight of the composition. Such flow control agents, which enhance the compositions melt-flow properties and assist in eliminating surface defects, typically include acrylics and fluorine based polymers. Examples of commercially available flow control agents include: Resiflow® P-67, Resiflow® P-200 and Clearflow® (all available from Estron Chemical Inc., Calvert City, Ky.); BYK® 361 and BYK® 300 from BYK Chemie (Wallingford, CONN); Mondaflow® 2000 from Monsanto (St. Louis, Mo.); and, Acranal 4F from BASF.

Degassing agents can also be used in the powder coating compositions of the present invention in an amount between 0.1 and 5 wt. %, based on the weight of the composition. Such degassing agents facilitate the release of gases during the curing process. Examples of commercially available degassing agents include: Benzoin available from Well Worth Medicines; and, Uraflow® B available from GCA Chemical Corporation (Brandenton, Fla.).

The powder coating compositions may also preferably comprise an antiblocking agent (dry-flow additive) in an amount from 0.05 to 1.0 wt. %, based on the total weight of the composition. Examples of such additives include fumed silica, precipitated silica, fumed alumina, clay, talc and mixtures thereof.

Colorants or pigments useful in the powders of the present invention may include carbon black, such as 9875 Black available from Engelhard Corporation (Ohio), metal flakes, and heat resistant pigments, such as the various iron oxide pigments and mixed metal oxide pigments. Especially common is the use of Titanium dioxide pigments. The amount of colorant or pigment may range up to 20 parts per hundred resin by weight (phr), and preferably ranges from 0.1 to 15 phr, more preferably from 0.5 to 10 phr.

Process of Manufacture of the Powder Coating

The process of the present invention will be described with reference to FIG. 2 which depicts a melt extruder suitable for use in the present invention.

The components of the premix will, typically, be dry-blended together. Where this dry-blending (and/or later extrusion) could potentially damage certain of the composition components listed above or, equally, where certain abrasive components could damage the blenders and/or the extruders, it may be necessary to add such components to the formed powder rather than include them in the premix itself. For example, it will typically be more appropriate to post-blend additives such as fumed silicas and aluminum oxide.

Figure 1:
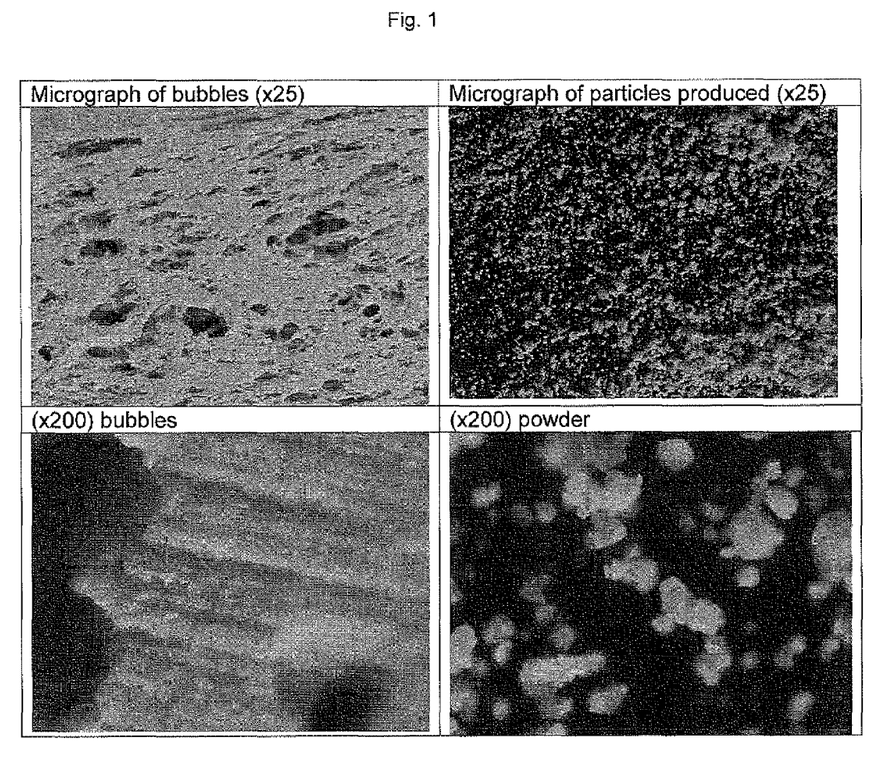
FIG. 1 is a four part micrograph showing, under two magnifications, the gas cells within the extrudate and the particulate structure of the powder produced in accordance with the present invention.
Figure 2:
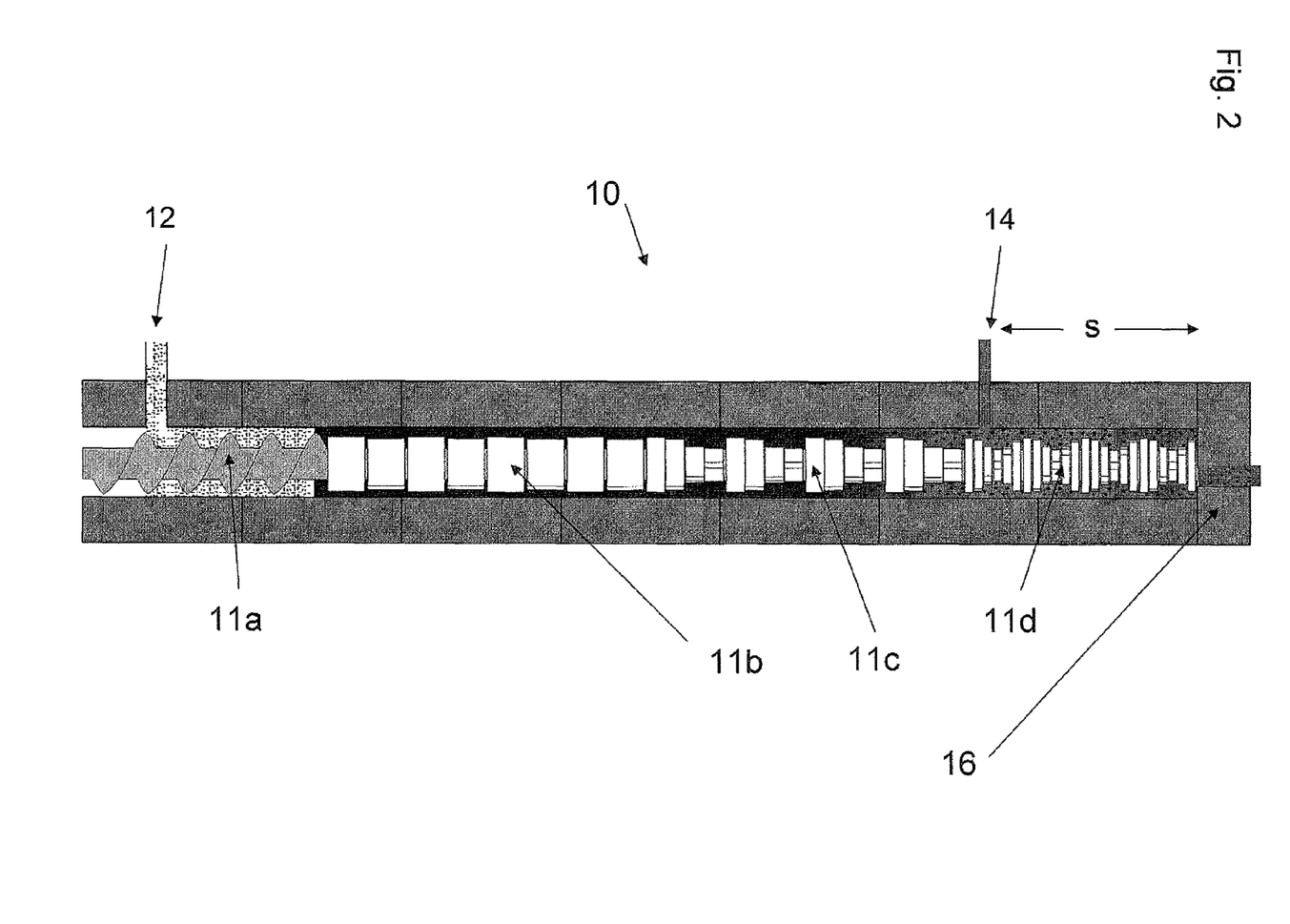
FIG. 2 is an illustration of a melt extruder suitable for performing the process of this invention.

Referring to FIG. 2, there is provided a melt extruder (10) for processing the powder coating premix. A stream of the premix from the dry blender may be fed directly into the melt extruder at input (12).

The melt extruder (10) is illustrated herein as a sectional drawing showing one half of a co-rotating twin screw extruder. This comprises a tube or barrel within which a pair of screw shafts are fitted with a number of different screw elements. These elements are arranged in a linear configuration such that each pair of screws intermeshes when operated in a co-rotating manner and transports the material towards the exit die (16). Variations on the configuration of the screw elements are of course possible. Such variations, together with the operating rotational speed, allow control of the flow of the premix at different points along the length of the extruder (10) and hence control the pressure at different points along the barrel. However, independently of this configuration, it is preferred that the screws are operated continuously and that the molten feed is subjected to high shear mixing within a substantial portion of the melt extruder (10). The barrel is fitted with heating and cooling means to control the melt temperature as required at different points along the barrel. The feed zone (11a) is generally cooled to below 20° C. to prevent blockages in the feed throat. The melting zone (11b) is generally heated above the $T_g$ of the resin components. The dispersion zone (11c) is generally cooled to maintain a melt temperature at the operating process temperature, the high shear screw configuration and the work applied by the screws to the melt acting to maintain the melt temperature by viscous heating.

The melt extruder (10) also includes an input (14) through which the process liquid is introduced. Although only one such input (14) is illustrated, it will be appreciated that the liquids could, if desired, be added at different input locations along the extruder (10) including the feed throat (12). To ensure maximum uptake of the process liquid by the materials in the extruder (10), preferably this liquid is directly injected into the barrel portion of the extruder (10).

Broadly, the premix blend will pass along the length of extruder (10) and in particular at portion S wherein it is treated with the process liquid. The temperature and pressure conditions in the extruder at portion S must be such that the blended premix remains within the molten state and the injected process liquid does not evaporate or reach a supercritical state. It should be noted that as the process liquid is added in such small relative amounts (by weight percent), its addition has minimal effect on the melt temperature in the portion S of the extruder (10) and the liquid's temperature quickly equilibrates with that of the melt. As a consequence of this, the skilled person would be aware that a broad range of temperature and pressure conditions for the injection of the process liquid could be employed. However, it is presently preferred that the process liquid is preheated in a suitable device prior to its injection into the extruder. Where preheating is employed, the process liquid must not also attain supercritical conditions. In that embodiment where water or demineralised water is employed as the liquid, the water temperature at injection should preferably be maintained in the range from 25° C. to 90° C. It will be easily appreciated that the process liquid could also be simply introduced together with the premix or mixed with any of the premix ingredients provided that the resultant cohesive nature of the premix is properly managed.

For the majority of the powder coating compositions for which this invention is envisaged, the melt temperatures in the extruder will typically be less than 200° C. and will preferably be in the range from 110° C. to 140° C. For such temperature conditions, the pressure under which the liquids employed in the present invention evaporate may be found, for example, by consulting Steam Tables such as those in *Thermodynamic and Transport Properties of Fluids* G. Rogers and Y. R. Mayhew, published by Blackwell UK (ISBN0-631-19703-6) (for water and demineralised water). The pressure in the extruder at portion S should be controlled to ensure evaporation of the liquid does not occur and that also supercritical conditions are not attained by those liquids. Said pressure is a function inter alia of the premix feed rate into the extruder, the rotation speed of the screw elements, the extruder temperature and the feed rate and pressure of the injected liquid.

To achieve the preferred thermal conditions for water, demineralised water or deionised water as the process liquids, the required pressure conditions in the portion S at the temperature of 200° C. will be less than 16 bar. Similarly, for water or demineralised water in the preferred temperature range of 110° to 140° C., the pressure should be maintained in the range from about 1.5 to 3.6 bar.

Where water or demineralised water is employed as the process liquid, advantageous effects have been found when the water is pumped at pressures higher than the pressure existing within the extruder. A pressure sustaining valve may be used to provide constant load and working conditions for the pump, thereby maintaining process stability. Preferably said sustaining pressure is in the range from 5 to 30 bar, more preferably from 10 to 30 bar and most preferably from 12 to 18 bar. The pressure at which the liquid is injected can be controlled using an appropriate pump.

In portion S of the melt extruder (10) the process liquid is mixed with the materials in the powder coating precursor composition. The amount of liquid added in the process of this invention ensures that the throughput of the materials being processed is maintained to an extent that is similar to where no process fluid is added. Furthermore, this amount by weight ensures that the liquid does not reduce the viscosity of the materials to the extent that either poor mixing or flow reversal occurs within the melt extruder (10).

The molten premix which has been mixed in the extruder and treated with the injected process liquid—hereinafter the powder coating precursor—flows to the extruder die (16). As known in the art, the die (16) may be provided with a plurality of apertures in a number of different configurations. No particular configuration is preferred for the present invention. Equally, the skilled reader will be aware that the die (16) may be replaced by other devices which allow for a pressure drop across them; for example, such a pressure drop could be achieved using a particular screw configuration. In any event, the average residence time of the blend within the melt extruder will generally be less than 2 minutes and more typically in the range from 30 to 45 seconds.

It should be noted that the pressure within the portion S of the extruder may not be the same as that at the die exit (16). That exit pressure depends on the geometry of the die, the viscosity of the melt to be extruded (which is also a function of temperature) and the flow rate. Therefore, by varying the configuration and speed of the screw elements in the extruder and the flow of material at the liquid injection point, the injection pressure can be higher or lower than the exit pressure. However, under practical operating conditions, the die exit pressure will preferably be greater than the pressure condition in the portion S of the melt extruder (10).

As the stream of molten precursor passes through the die (16) it is necessarily released to a lower pressure and collected. As a result of such release, the process liquid in the flow stream rapidly—preferably instantaneously gasifies—resulting in the foaming of the extrudate. The evaporation of the liquid also serves to cool the extrudate and introduces discontinuities into the solid thus formed. At the higher limit of the range by weight of process liquid addition, this cooling effect will be such that only limited further cooling of the extrudate is required prior to its comminution into particles. However, secondary cooling, using a chilled roller for example, may be required at liquid injection levels below 5 wt. % in order to prevent the foamed extrudate from coalescing.

The evaporation of the liquid ensures its effective removal from the powder coating. Consequently, while the use of liquid has advantageous effects upon the structure of the cooled extrudate, the liquids will not detrimentally affect the properties of powder coatings derived from that extrudate. Furthermore, the evaporate can be recovered and passed through a condenser and/or a separator to regenerate the liquid.

The powder coating material is recovered, preferably in the form of a stream, and is then subjected to further processing steps in which it is comminuted to the desired particulate dimensions. Such steps may include at least one of grinding and screening. As a consequence of the weaknesses introduced into the material, these steps can be performed faster and/or at lower energetic cost than for extrudates not treated with the process liquid. The derived particles are then passed to a final product collecting vessel for subsequent packaging and handling.

In general, the powder coatings prepared in accordance with the invention are suitable for application to a wide variety of substrate materials including metallic and non-metallic substrates. For example, the powder coatings may be applied to various metallic substrates which are inert to the coating material such as iron, steel and aluminum. Suitable non-metallic substrates can include wood and paper-based substrates including particle board and cardboard, glass, ceramics, plastics and rubber, for example.

The present invention is further illustrated in the following example. However, it is to be understood that all changes that come within the scope of the invention are desired to be protected and thus the invention is not to be construed as being limited by these examples.

EXAMPLE

Example 1

In this Example, the process liquid added to the extruder was demineralised water. A powder coating premix was prepared by dry blending the components shown in Table 1.

TABLE 1

| COMPONENT | SUPPLIER | PARTS BY WEIGHT |
|---|---|---|
| CRYLCOAT 7617 | UCB | 560.0 |
| PRIMID XL-552 | | 30.0 |
| RESIFLOW PV88 | WORLEE | 8.0 |
| BENZOIN | | 2.0 |
| KRONOS (TiO$_2$) | KRONOS | 400.0 |

This dry premix was introduced into a Berstoff Extruder ZE25 at a solids feeds rate of 16 kg/h. Said extruder was maintained at a process temperature of 120° C. and an exit pressure of 2 bar. Further, said extruder was equipped with a die head outlet fitted with 2 holes of 3.5 mm diameter from which the (foamed) product was extruded. The extruder was connected to Brabender feeders which controlled the premix addition rate and the injection rate of water into the extruder.

Five experiments were performed using this premix and extruder, these being summarized in Table 2. Where employed, the water was injected at a temperature of 85° C. and a pressure of 15 to 20 bar. The extrudates from these experiments were separately collected in a receiver for characterization.

TABLE 2

| EXPERIMENT | ROTATION SPEED OF THE EXTRUDER SCREW (RPM) | % BY WEIGHT WATER INJECTED. |
|---|---|---|
| 1 | 400 | 6.25 |
| 2 | 800 | 6.25 |
| 3 | 400 | 12.15 |
| 4 | 800 | 12.15 |
| 5 (Control) | 400 | 0 |

The extrudates from experiments 1 to 4 were characterized by being stable foamed products without the need for further cooling. The control sample showed coalescence on extrusion and therefore was treated by cooling.

Figure 3:
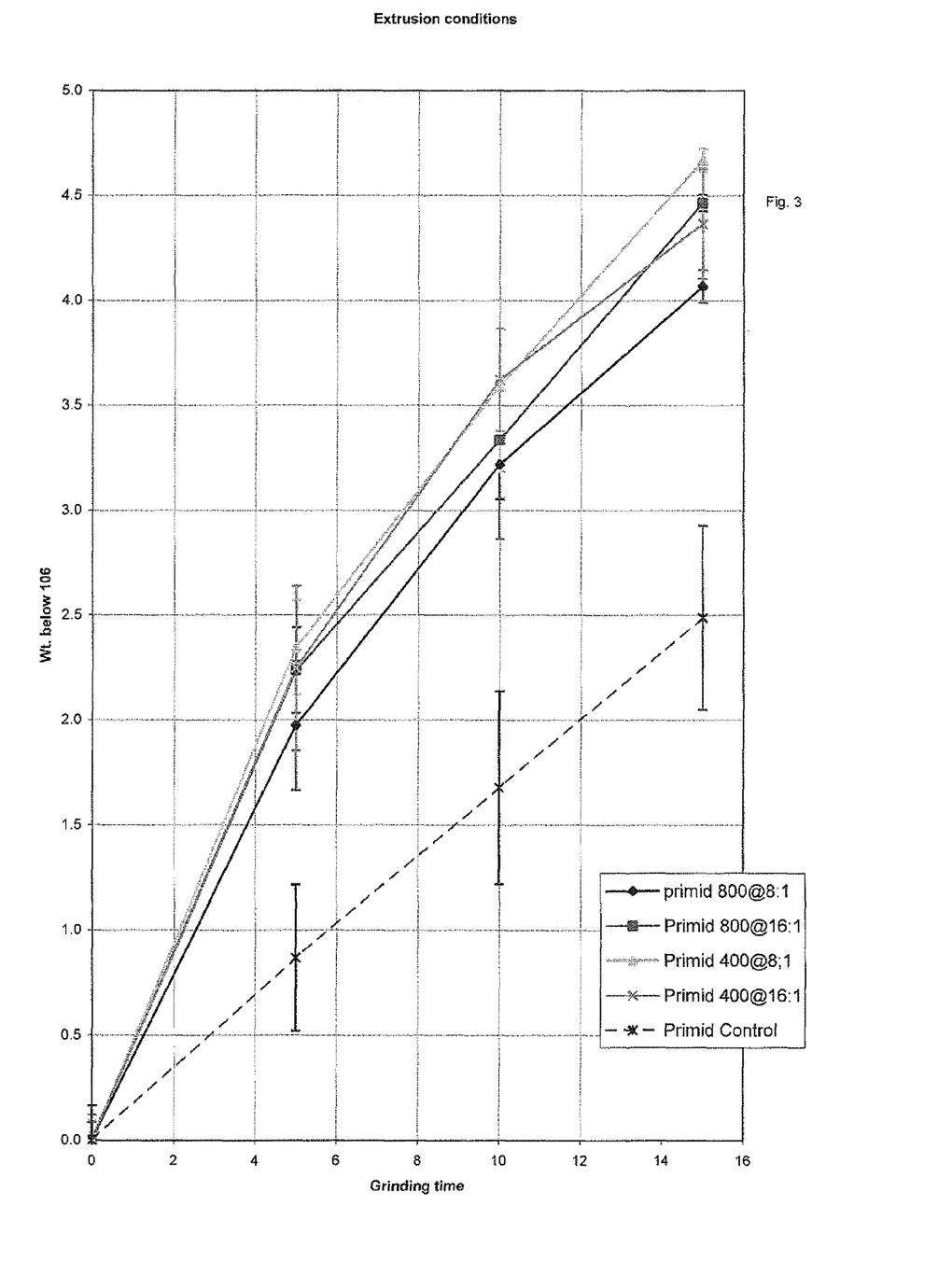
FIG. 3 compares grindability data of four extrudate powders prepared in accordance with the process of the present invention with a powder prepared without employing a process liquid in the extrusion.

A 10 g sample of particles between 2.0 to 1.5 mm sieved size fraction of each of the extrudates was individually ground using a Moulinex coffee grinder applying the same conditions to each sample. The mass of particles having a size of less than 106 microns was then measured after 5, 10 and 15 seconds grinding time. The procedure was repeated a number of times to ensure confidence in the results. The results are shown in FIG. 3 and indicate that the friability of the extrudate is significantly enhanced by the injection of water, at 6.25 and 12.15 wt. % into the premix. The errors indicated were derived from ± the mass difference between the total sample at the start of the test (10 g) minus the total weight collected at the end of the test (both passing and retained by a 106 micron mesh sieve).

Example 2

Two samples of the product of Experiments 1 and 5 of Example 1 were individually ground using an air classifying mill 4S CMT (available from Powder Processing Systems [PPS], Shoeburyness, UK). The airflow, rotor and classifier speeds were kept constant for both samples. The rotor current was maintained for both samples at 18 Amps by adjusting the feed rate of the sample material. The first sample (std.)—where water had not been injected into the extruder—was fed through said mill at a rate of 200 kg/hr and the second sample (test)—where water had been injected into the extruder—was fed through at a rate of 300 kg/hr.

Figure 4:
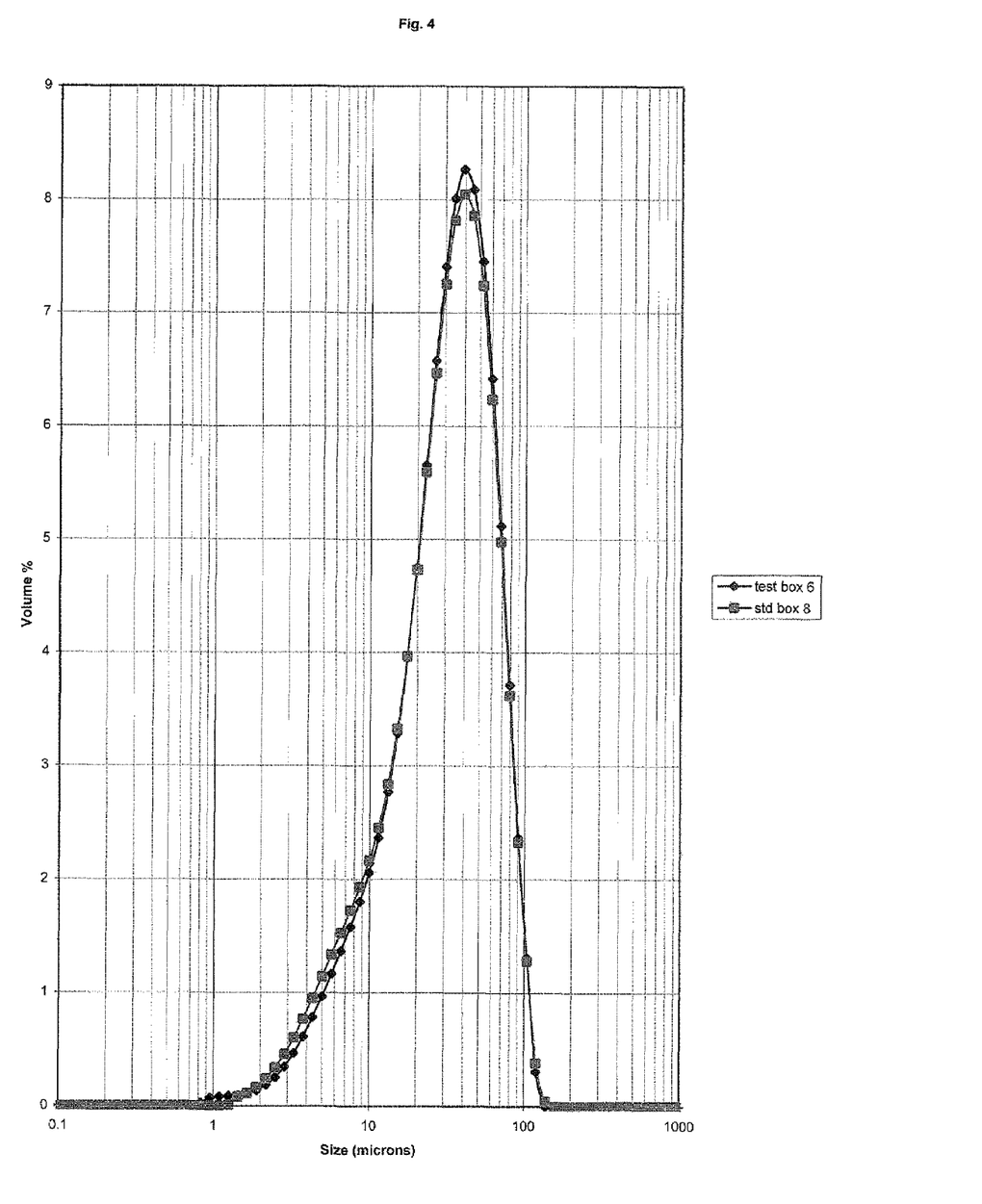
FIG. 4 is a particle size distribution plot obtained using a Malvern Mastersizer for a product obtained in accordance with the present invention but which has been milled at two different throughput rates.

The particle size distributions of the two milled products were then measured by Malvern Mastersizer and are shown in FIG. 4. As can be seen from that figure, the 50% increase in the throughput rate did not significantly impact the particle size distributions of the milled product. Furthermore, extensive quality control testing of the powder coating products from this experiment including QVU, salt spray, impact, solvent rubs and appearance, could find no distinction between the samples.

The invention claimed is:

1. A process for the manufacture of a powder coating comprising the steps of:
   Preparing a powder coating premix comprising a resin and optionally a crosslinker for said resin;
   Feeding the premix through a melt extruder;
   Adding to the melt extruder between 1 and 25 wt. %, by weight of the premix, of a process liquid which is immiscible with at least said resin of the powder coating premix;
   Cooling the extruded material comprising evaporation of the process liquid immediately when the premix leaves the extruder, wherein the evaporation cools the extrudate and introduces discontinuities into the solid formed; and
   Comminuting it to fine particles.

2. The process according to claim 1, wherein at least part of the process liquid is added to the melt extruder in combination with the premix feed.

3. The process according to claim 1, wherein said resin is selected from the group consisting of thermosetting resins having a softening point between 45° and 120° C.

4. The process according to claim 3, wherein said thermosetting resin comprises a carboxyl functional polyester.

5. The process according to claim 3, wherein said thermosetting resin comprises a hydroxyl functional polyester.

6. The process according to claim 5, wherein a crosslinker is provided in said powder coating premix, said crosslinker comprising an aliphatic or aromatic isocyanate or an aminoplast.

7. The process according to claim 3, wherein said thermosetting resin is a hybrid resin selected from the group consisting of epoxy-acrylic, polyester-acrylic, and epoxy-polyester resin systems.

8. The process according to claim 1, wherein said process liquid is added in an amount between 1 and 15 wt. %, by weight of the premix.

9. The process according to claim 1, wherein the process liquid is selected from the group consisting of water, demineralised water and deionised water liquid mixtures thereof.

10. The process according to claim 9, wherein the process liquid comprises demineralised water.

11. The process according to claim 9, wherein the process liquid contain up to 50% dissolved materials selected from the group consisting of Carbon Dioxide, Ammonia and Nitrous Oxide.

12. The process according to claim 1, wherein the melt extruder conditions comprise a temperature in the range from 100° to 200° C. and a pressure in the range from 1 to 16 bar.

13. The process according to claim 12, wherein the melt extruder conditions comprise a temperature in the range from 110° to 140° C. and a pressure in the range from 1.5 to 3.6 bar.

14. A process for the manufacture of a powder coating comprising the steps of:
   Preparing a powder coating premix comprising a resin and a crosslinker for said resin;
   Feeding the premix through a melt extruder maintained at a temperature in the range from 100° to 200° C. and a pressure in the range from 1 to 16 bar;
   Adding to the melt extruder between 1 and 25 wt. %, by weight of the premix, of demineralized water;
   Cooling the extruded material comprising evaporation of said demineralized water immediately when the premix leaves the extruder, wherein the evaporation cools the extrudate and introduces discontinuities into the solid formed; and
   Comminuting it to fine particles.

* * * * *

UNITED STATES PATENT AND TRADEMARK OFFICE
CERTIFICATE OF CORRECTION

PATENT NO.       : 8,377,346 B2                                  Page 1 of 1
APPLICATION NO. : 12/678076
DATED            : February 19, 2013
INVENTOR(S)      : Morgan et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 101 days.

Signed and Sealed this
First Day of September, 2015

Michelle K. Lee
*Director of the United States Patent and Trademark Office*